(12) United States Patent
Takayanagi et al.

(10) Patent No.: US 8,594,059 B2
(45) Date of Patent: *Nov. 26, 2013

(54) INFORMATION TRANSMITTING METHOD AND INFORMATION TRANSMITTING SYSTEM

(75) Inventors: Daigo Takayanagi, Yokohama (JP); Shiro Mazawa, Fujisawa (JP); Yosuke Takahashi, Yokohama (JP); Akihiko Yoshida, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 50 days.

This patent is subject to a terminal disclaimer.

(21) Appl. No.: 12/411,996

(22) Filed: Mar. 26, 2009

(65) Prior Publication Data

US 2009/0180419 A1    Jul. 16, 2009

Related U.S. Application Data

(63) Continuation of application No. 11/353,173, filed on Feb. 14, 2006.

(30) Foreign Application Priority Data

Mar. 30, 2005   (JP) ................................. 2005-097759

(51) Int. Cl.
*H04W 4/00*          (2009.01)
(52) U.S. Cl.
USPC .......................................... 370/338; 370/455
(58) Field of Classification Search
USPC ........................................................ 370/338
See application file for complete search history.

(56) References Cited

U.S. PATENT DOCUMENTS

| 6,618,373 | B1 * | 9/2003 | Subramaniam ............... 370/390 |
| 6,850,489 | B1 * | 2/2005 | Omi et al. ..................... 370/230 |
| 7,990,939 | B2 * | 8/2011 | Takayanagi et al. .......... 370/338 |
| 2004/0117498 | A1 | 6/2004 | Hashimoto et al. |
| 2004/0184471 | A1 * | 9/2004 | Chuah et al. .................. 370/420 |
| 2006/0146889 | A1 * | 7/2006 | Malkamaki et al. .......... 370/506 |

FOREIGN PATENT DOCUMENTS

| CN | 1516937    | 7/2004 |
| JP | 2003-273925 | 9/2003 |
| JP | 2004-186892 | 7/2004 |

* cited by examiner

*Primary Examiner* — Patrick Edouard
*Assistant Examiner* — Chuck Huynh
(74) *Attorney, Agent, or Firm* — Antonelli, Terry, Stout & Kraus, LLP.

(57) ABSTRACT

An information transmitting method including; determining, on a basis of a packet error rate from a master station to slave stations, a number of times of multicast transmission in accordance with an expected value of a number of slave stations that transmit a retransmission request, an expected value of a number of retransmitted packets responding to the retransmission request, or a probability that the slave stations receive all packets forming information; notifying determined number of times of multicast transmission to the slave stations; and transmitting, to plural slave stations in multicast, same information formed of plural packets the determined times of multicast transmission.

9 Claims, 22 Drawing Sheets

EXAMPLE OF INFORMATION TRANSMITTING SYSTEM

| DATA NUMBER | SERVICE AREA | NUMBER OF SERVICE DATA PACKETS | SERVICE START TIME | NUMBER OF TIMES OF MULTICAST TRANSMISSION DETERMINING METHOD ID | C1 | C2 | C3 |
|---|---|---|---|---|---|---|---|
| 1 | 1b,1c,2a | 10000 | 0:00 | 1 | 0.1 | — | — |
| 2 | | | | | | | |
| 3 | | | | | | | |

FIG. 9

BASE STATION 12-1 422-1

| SERVICE DATA 1 | |
|---|---|
| AREA | NUMBER OF TIMES |
| 1a | 0 |
| 1b | 3 |
| 1c | 2 |

BASE STATION 12-2 422-2

| SERVICE DATA 1 | |
|---|---|
| AREA | NUMBER OF TIMES |
| 2a | 1 |
| 2b | 0 |
| 2c | 0 |

| AREA | NUMBER OF TERMINALS |
|---|---|
| a | i |
| b | j |
| c | k |

FIG. 10B

| RADIO BASE STATION ID | SERVICE DATA NUMBER | PDSN SERVICE DATA TRANSMISSION START TIME | SYNCHRONIZATION INFORMATION | MAXIMUM NUMBER OF TIMES OF MULTICAST TRANSMISSION |
|---|---|---|---|---|
| 2-1 | 1 | 0:00 | 1 | 3 |
| 2-2 | 1 | 0:00 | 1 | 2 |

| | | 711 | |
|---|---|---|---|
| SERVICE DATA NUMBER | 1 | 2 | 3 |
| NUMBER OF SERVICE DATA PACKETS | 1000 | | |
| SERVICE AREA | 1b,1c,2a | | |
| TRANSMISSION TIME OF RADIO NETWORK CONTROL DEVICE SERVICE IMPLEMENTATION REQUEST | 23:00 | | |
| PDSN SERVICE DATA TRANSMISSION START TIME | 23:55 | | |
| SYNCHRONIZATION INFORMATION | 1 | | |
| SERVICE START TIME | 0:00 | | |
| NUMBER OF TIMES OF MULTICAST TRANSMISSION DETERMINING METHOD ID | 1 | | |
| C1 | 0.1 | | |
| C2 | — | | |
| C3 | — | | |
| DECRYPTION KEY | 010110 | | |

FIG. 12

PROCESSING AT THE TIME WHEN RADIO NETWORK SIDE RECEIVING UNIT 401 OF RADIO BASE STATION RECEIVES SERVICE DATA

PROCESSING AT THE TIME WHEN TIME REACHES SERVICE START TIME IN RADIO BASE STATION

PROCESSING AT THE TIME WHEN RADIO NETWORK SIDE RECEIVING UNIT 65 OF PDSN 14 RECEIVES MAXIMUM NUMBER OF TIMES OF MULTICAST TRANSMISSION NOTICE

PROCESSING AT THE TIME WHEN IP NETWORK SIDE RECEIVING UNIT 61 OF PDSN 14 RECEIVES PDSN SERVICE DATA INFORMATION

PROCESSING AT THE TIME
WHEN IP NETWORK SIDE
RECEIVING UNIT 61 OF PDSN 14
RECEIVES SERVICE DATA ( IP NETWORK SIDE RECEIVING UNIT 61 RECEIVES SERVICE DATA )

STORE SERVICE DATA IN SERVICE DATA STORING UNIT 67

( END )

FIG. 19A

PROCESSING AT THE TIME
WHEN TIME REACHES PDSN
SERVICE DATA TRANSMISSION
START TIME IN PDSN 14

( IN PDSN, TIME REACHES PDSN SERVICE DATA TRANSMISSION START TIME IN MULTICAST INFORMATION TABLE IN MULTICAST INFORMATION STORING UNIT 66 )

NUMBER OF TIMES OF TRANSMISSION STORED IN MULTICAST INFORMATION TABLE IN MULTICAST INFORMATION STORING UNIT

TRANSMIT SERVICE DATA STORED IN SERVICE DATA STORING UNIT 67 TO CORRESPONDING RADIO BASE STATION IN MULTICAST INFORMATION TABLE ( END )

FIG. 19B

PROCESSING AT THE TIME
WHEN RADIO NETWORK SIDE
RECEIVING UNIT 65 OF PDSN 14
RECEIVES RETRANSMISSION REQUEST ( RADIO NETWORK SIDE RECEIVING UNIT 65 RECEIVES RETRANSMISSION REQUEST )

TRANSMIT REQUESTED PACKET IN UNICAST ( END )

FIG. 19C

PROCESSING AT THE TIME WHEN RECEIVING UNIT 74 OF BROADCAST DOWNLOAD SERVICE CONTROL DEVICE 15 RECEIVES DECRYPTION KEY REQUEST

PROCESSING AT THE TIME WHEN TIME REACHES RADIO NETWORK CONTROL DEVICE SERVICE IMPLEMENTATION REQUEST TRANSMISSION TIME IN BROADCAST DOWNLOAD SERVICE CONTROL DEVICE 15

PROCESSING AT THE TIME WHEN RECEIVING UNIT 74 OF BROADCAST DOWNLOAD SERVICE CONTROL DEVICE 15 RECEIVES SERVICE DATA INFORMATION REQUEST

PROCESSING AT THE TIME WHEN RECEIVING UNIT 74 OF BROADCAST DOWNLOAD SERVICE CONTROL DEVICE 15 RECEIVES PDSN SERVICE DATA INFORMATION REQUEST

INFORMATION TRANSMITTING METHOD AND INFORMATION TRANSMITTING SYSTEM

CROSS REFERENCE TO RELATED APPLICATION

This is a continuation of U.S. application Ser. No. 11/353,173, filed Feb. 14, 2006. This application relates to and claims priority from Japanese Patent Application No. 2005-097759, filed on Mar. 30, 2005. The entirety of the contents and subject matter of all of the above is incorporated herein by reference.

BACKGROUND OF THE INVENTION

The present invention relates to an information transmitting method and an information transmitting system, and, in particular to an information transmitting method and an information transmitting system for surely transmitting one piece of information to plural terminals (such a system will be hereinafter referred to as broadcast download) in a communication system that makes both multicast transmission and unicast transmission possible.

As information transmission, there are, for example, unicast transmission for transmitting a packet to separate addresses of respective terminals and multicast transmission for transmitting a packet to an address common to plural terminals. The unicast transmission has an advantage that it is possible to separately retransmit a packet to a terminal that fails to receive the packet. The unicast transmission has a disadvantage that, even when one piece of information is transmitted to plural terminals, a transmission capacity proportional to the number of receiving terminals is consumed. On the other hand, the multicast transmission has an advantage that, when one piece of information is transmitted to plural terminals, only a transmission capacity for one terminal is consumed. The multicast transmission has a disadvantage that it is impossible to separately retransmit a packet to a terminal that fails to receive the packet.

As a technique for realizing certainty of transmission, for example, a technology described in JP-A-2003-273925 is known. In the technique described in JP-A-2003-273925, for example, a master station sends a packet in multicast once and, then, waits for delivery confirmation information from slave stations. When the number of slave stations from which the delivery confirmation information is not obtained is larger than a threshold value, the master station retransmits the packet in multicast. When the number of such slave stations is smaller than the threshold value, the master station retransmits the packet in unicast. Consequently, certainty of transmission is realized.

A system for allowing a reception side to normally receive an abandoned packet without issuing a retransmission request for the abandoned packet is also known (e.g., US2004/0117498 A1).

In the broadcast download, for example, on the premise that information is surely transmitted, it is an object to minimize consumption of a transmission capacity and quickly perform transmission.

In the technique in which a master station transmits a packet in multicast and slave stations do not transmit delivery confirmation information or retransmission requests, it is impossible to guarantee that information is surely communicated to the respective slave stations. When the download broadcast is performed only by unicast, since a transmission capacity proportional to the number of slave stations is consumed, the transmission capacity is wastefully consumed compared with transmission by multicast. In the case of time division multiplex, time required for transmission increases as the number of slave stations increases.

On the other hand, when only first transmission is performed by multicast and retransmission is performed by unicast, in particular, when there are a large number of retransmission requests, at a stage of first retransmission, a problem same as the problem of the broadcast download performed only by unicast.

As in JP-A-2003-273925, when multicast and unicast is switched on a basis of delivery confirmation information from the slave stations every time transmission is performed, since the delivery confirmation information is transmitted from the slave stations every time, an up transmission capacity is suppressed. For example, since delivery confirmation information generated by the slave stations increases in proportion to the number of slave stations every time the master station transmits a packet, when there are a large number of slave station, an up transmission capacity is suppressed. Moreover, since it is necessary to provide time for waiting for delivery confirmation information, quick transmission of information is hindered. For example, since it is necessary to provide time for waiting for delivery confirmation information from the slave stations every time the master station transmits a packet, efficiency is low in terms of quickness.

SUMMARY OF THE INVENTION

The invention has been devised in view of the problems and it is an object of the invention to provide an information transmitting method and an information transmitting system for performing transmission surely and quickly by controlling consumption of a transmission capacity in broadcast download. It is another object of the invention to control an up transmission capacity and reduce the number of times of multicast transmission as much as possible. It is still another object of the invention to reduce time required for surely transmitting information. It is still another object of the invention to provide a method of determining the number of times of multicast transmission.

In order to solve the problem, in the invention, in order to surely and quickly perform transmission without wastefully consuming a transmission capacity in the broadcast download, first, transmission is started in multicast and, after a several times of multicast, transmission is switched to unicast. As a characteristic of the invention, for example, first, a master station transmits identical information in multicast continuously for a plural times, then, receives a retransmission request from a slave station for the first time, and, after that, solely perform retransmission in unicast. The slave station indicates, for example, a radio terminal. The master station indicates, for example, a radio base station or an apparatus such as PDSN.

As another characteristic of the invention, (1) a method of determining an expected value of the number of slave stations that request retransmission to be equal to or smaller than a predetermined ratio of a total number of slave stations, (2) a method of determining an expected value of the number of packets requested to be retransmitted per one slave station to be equal to or smaller than a predetermined ratio of the number of service data packets, or (3) a method of determining a probability that slave stations after receiving information in multicast a determined number of times have completed reception of all pieces of information to be a predetermined probability is used as a method of determining the number of times of multicast transmission.

An information transmitting system of the invention is, for example, an information transmitting system in which a master station transmits identical information to plural slave stations. As a characteristic of the information transmitting system, first, the master station transmits the information to the slave stations in multicast continuously for a plural number of times. The slave stations receive the information through the continuous plural times of multicast. When there is a lack in the information, a slave station transmits a retransmission request to the master station. The master station retransmits the information to the slave station, which transmits the retransmission request, in unicast. The slave station, which transmits the retransmission request, receives the information retransmitted from the master station, which receives the retransmission requests, in unicast.

In the information transmitting system, it is possible to notify, before the master station performs multicast transmission, the slave stations of the number of times of the multicast transmission. In the information transmitting system as a method with which the master station determines the number of times of multicast transmission, it is possible to use a method of determining an expected value of the number of slave stations that request retransmission by unicast to be equal to or smaller than a predetermined ratio of a total number of slave stations.

In the information transmitting system, as a method with which the master station determines the number of times of multicast transmission, it is possible to use a method of determining an expected value of the number of retransmitted packets responding to retransmission requests by unicast of one slave station to be equal to or smaller than a predetermined ratio of the number of service data packets. In the information transmitting system, as a method with which the master station determines the number of times of multicast transmission, it is possible to use a method of determining a probability that slave stations after receiving multicast transmission of a determined number of times have completed reception of all pieces of information to be a predetermined probability.

A master station of the invention is, for example, a master station of an information transmitting system in which the master station transmits identical information to plural slave station. As a characteristic, the master station has a function of transmitting identical information to the slave stations in multicast and retransmitting the information to a slave station, which requests retransmission, in unicast.

A slave station of the invention is, for example, a slave station of an information transmitting system in which a master station transmits identical information to plural stations. As a characteristic, the slave station has a function of receiving the information from the master station in multicast and, when there is a lack in the information, transmitting retransmission requests to the master station, and receiving retransmitted information from the master station, which receives the retransmission requests, in unicast.

The master station can have a function of notifying, before performing multicast transmission, the slave stations of the number of times of the multicast transmission. The master station can have a function of determining the number of times of transmission in multicast according to a packet error rate, the number of slave stations, and the number of service data packets. The slave stations can have a function of receiving, in multicast, the information equivalent to the number of times of multicast transmission notified from the master station, abandoning information received redundantly, and holding one piece of information.

According to first solving meaning of the invention, there is provided an information transmitting method including:

determining, on a basis of a packet error rate from a master station to slave stations, a number of times of multicast transmission in accordance with an expected value of a number of slave stations that transmit a retransmission request, an expected value of a number of retransmitted packets responding to the retransmission request, or a probability that the slave stations receive all packets forming information;

notifying the determined number of times of multicast transmission to the slave stations;

transmitting, to plural slave stations in multicast, same information formed of plural packets the determined times of multicast transmission;

connecting unicast connection to a slave station that identifies a lacking packet after receiving information the notified times of multicast transmission;

receiving, from the slave station that receives information in multicast, a retransmission request including an identifier of the lacking packet among packets forming the information by the unicast connection; and retransmitting a packet corresponding to the identifier of the packet to the slave station by the unicast connection.

According to second solving means of the invention, there is provided a master station comprising:

a transmitting unit for transmitting information to slave stations;

a receiving unit for receiving information from the slave stations; and a control unit that controls information transmission to the slave stations, wherein the control unit:

determines, on a basis of a packet error rate from the master station to the slave stations, a number of times of multicast transmission in accordance with an expected value of a number of slave stations that transmit retransmission requests, an expected value of a number of retransmitted packets responding to the retransmission requests, or a probability that the slave stations receive all packets forming information, notifies the determined number of times of multicast transmission to the slave stations via the transmitting unit, transmits same information formed of plural packets to plural slave stations via the transmitting unit in multicast, the determined times of multicast transmission, connects unicast connection to a slave station that identifies a lacking packet after receiving information, the notified number of times of multicast transmission, receives, from the slave station that receives information in multicast, a retransmission request including an identifier of the lacking packet among packets forming the information by the unicast connection via the receiving unit; and retransmits a packet corresponding to the identifier of the packet to the slave station by the unicast connection.

BRIEF DESCRIPTION OF THE DRAWINGS

In the accompanying drawings:

FIG. 9 is a format diagram of a table in the radio base station;

FIG. 10 is a format diagram of the table in the radio base station;

FIG. 11 is a format diagram of a multicast information table in a PDSN 14;

FIG. 12 is a format diagram of a service information table in a broadcast download service control device 15;

FIGS. 19A to 19C are flowcharts of detailed processing of the PDSN;

DESCRIPTION OF THE PREFERRED EMBODIMENTS (Hardware Configuration)

Figure 1:
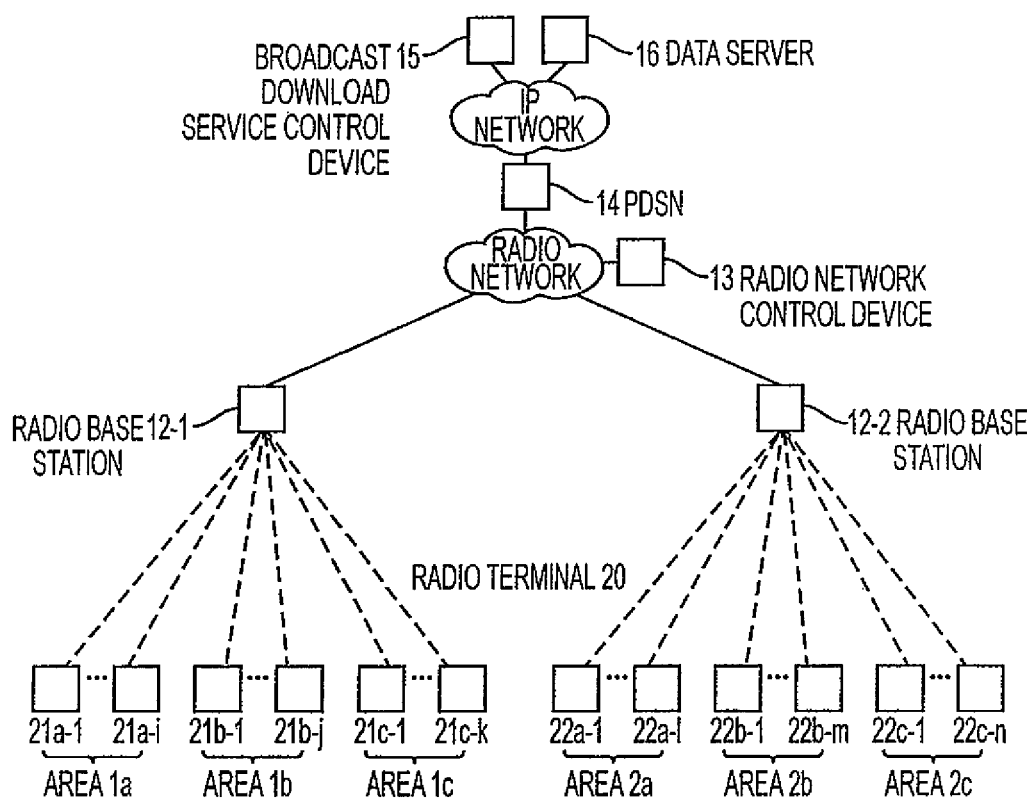
FIG. 1 is a diagram showing an example of an information transmitting system to which the invention is applied.

An example of an radio information transmitting system to which the invention is applied is shown in FIG. 1. This system comprises, for example, radio base stations 12, a radio network control device 13, a Packet Data Serving Node (PDSN) 14, a broadcast download service control device 15, and a data server 16. The radio base stations 12 (12-1 and 12-2) communicate with plural radio terminals 20 (21a to 22c). Communication may be performed by wire other than radio.

Service data for broadcast download is stored in the data server 16. Service information such as a service area and a service start time is stored in the service control device 15 for each service data. The service control device 15 controls a service. The PDSN 14 processes service data from the data server 16 in an IP network into a service packet for a radio network and transmits the service packet to the base stations 12 in the service area. The radio network control device 13 monitors and controls the radio base stations 12 via the radio network.

For example, one of the radio base stations 12 has transmission areas (areas 1a to 1c or areas 2a to 2c) in three directions and performs communication with the radio terminals 20 for each of the areas in time division multiplex. For example, the radio base stations 12 can transmit, in multicast, service data and data indicating the number of times of transmission for each of the areas. For example, the radio base station 12-1 has transmission areas 1a, 1b, and 1c and the radio base station 12-2 has transmission areas 2a, 2b, and 2c. For example, the radio terminals 21a-1 to 21a-i are in the area 1a, the radio terminals 21b-1 to 21b-j are in the area 1b, and the radio terminals 21c-1 to 21c-k are in the area 1c. Similarly, for example, the radio terminals 22a-1 to 22a-1 are in the area 2a, the radio terminals 22b-1 to 22b-m are in the area 2b, and the radio terminals 22c-1 to 22c-n are in the area 2c.

In unicast communication, when a packet reception error occurs, the radio terminals 20 transmit retransmission requests to the radio base stations 12. The radio base stations 12 retransmit packets to the respective radio terminals. In multicast communication, the radio base stations 12 add a strong error correction code to service data and guarantee that a packet error rate in an area is equal to or lower than a value P set in advance.

Functional constitutions of the respective nodes will be explained.

Figure 3:
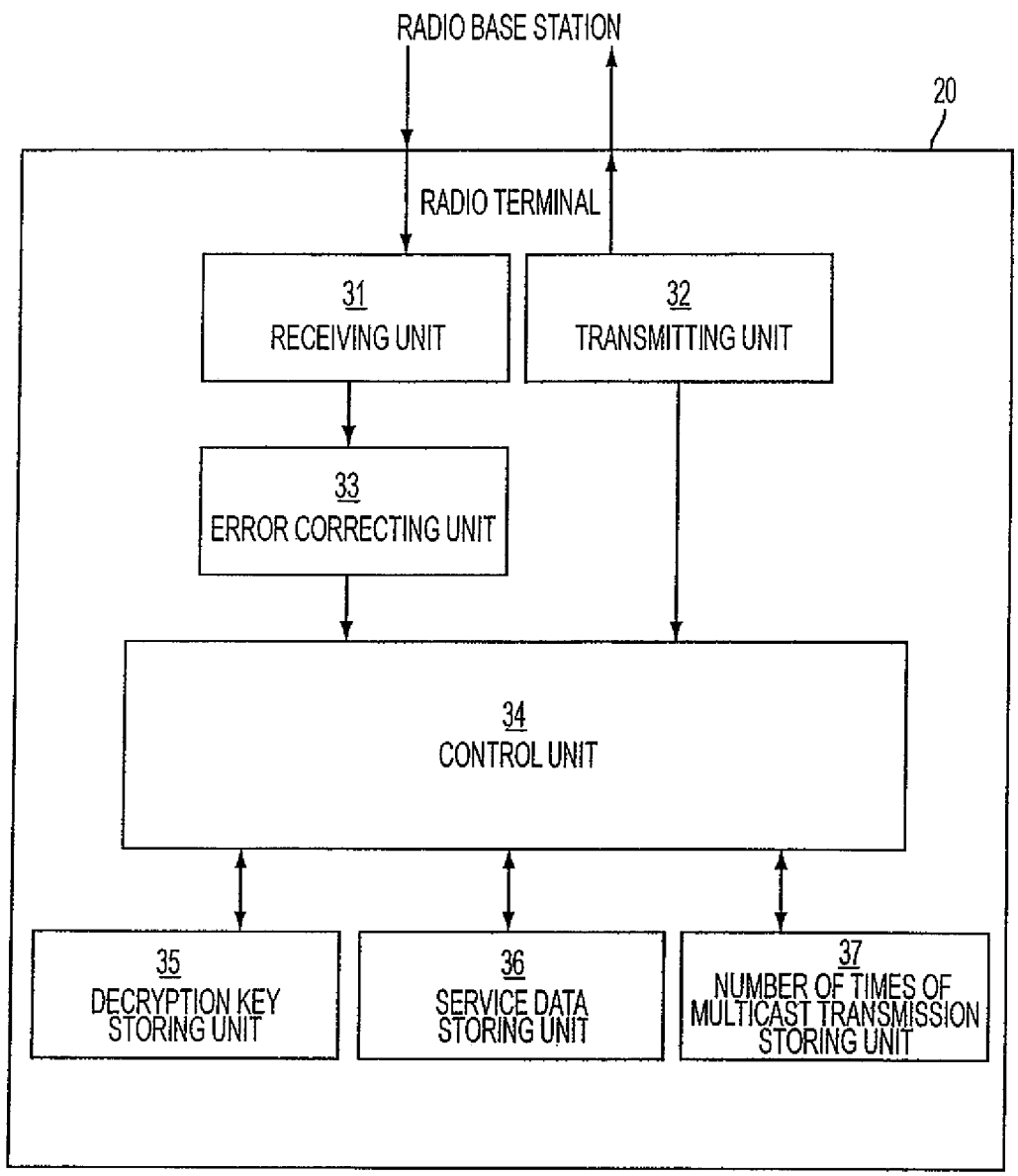
FIG. 3 is a block diagram showing a functional constitution of a radio terminal.

FIG. 3 is a block diagram showing a functional constitution of the radio terminal 20. The radio terminal 20 includes a receiving unit 31, a transmitting unit 32, an error correcting unit 33, a control unit 34, a decryption key storing unit 35, a service data storing unit 36, and a number of times of multicast transmission storing unit 37. In FIG. 3, the storing units 35 to 37 may be constituted by one storing unit or may be constituted by plural storing units.

The receiving unit 31 receives information transmitted from the radio base station 12 by radio. The transmitting unit 32 transmits information to the radio base station 12 by radio. The error correcting unit 33 subjects information received by the receiving unit 31 to error correction. The control unit 34 performs control according to a type of information received by the receiving unit 31.

Figure 13A:
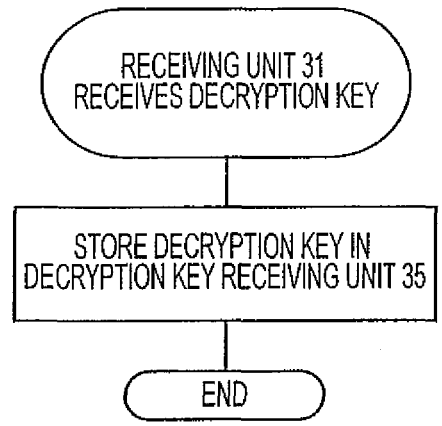
FIGS. 13A and 13B are flowchart of detailed processing of the radio terminal.

The control by the control unit 34 will be explained. FIG. 13A is a flowchart of control at the time when information received by the receiving unit 31 is a decryption key from the broadcast download service control device 15 (202 in FIG. 2). When the information received by the receiving unit 31 is the decryption key from the broadcast download service control device 15, the control unit 34 stores the decryption key in the decryption key storing unit 35.

Figure 2:
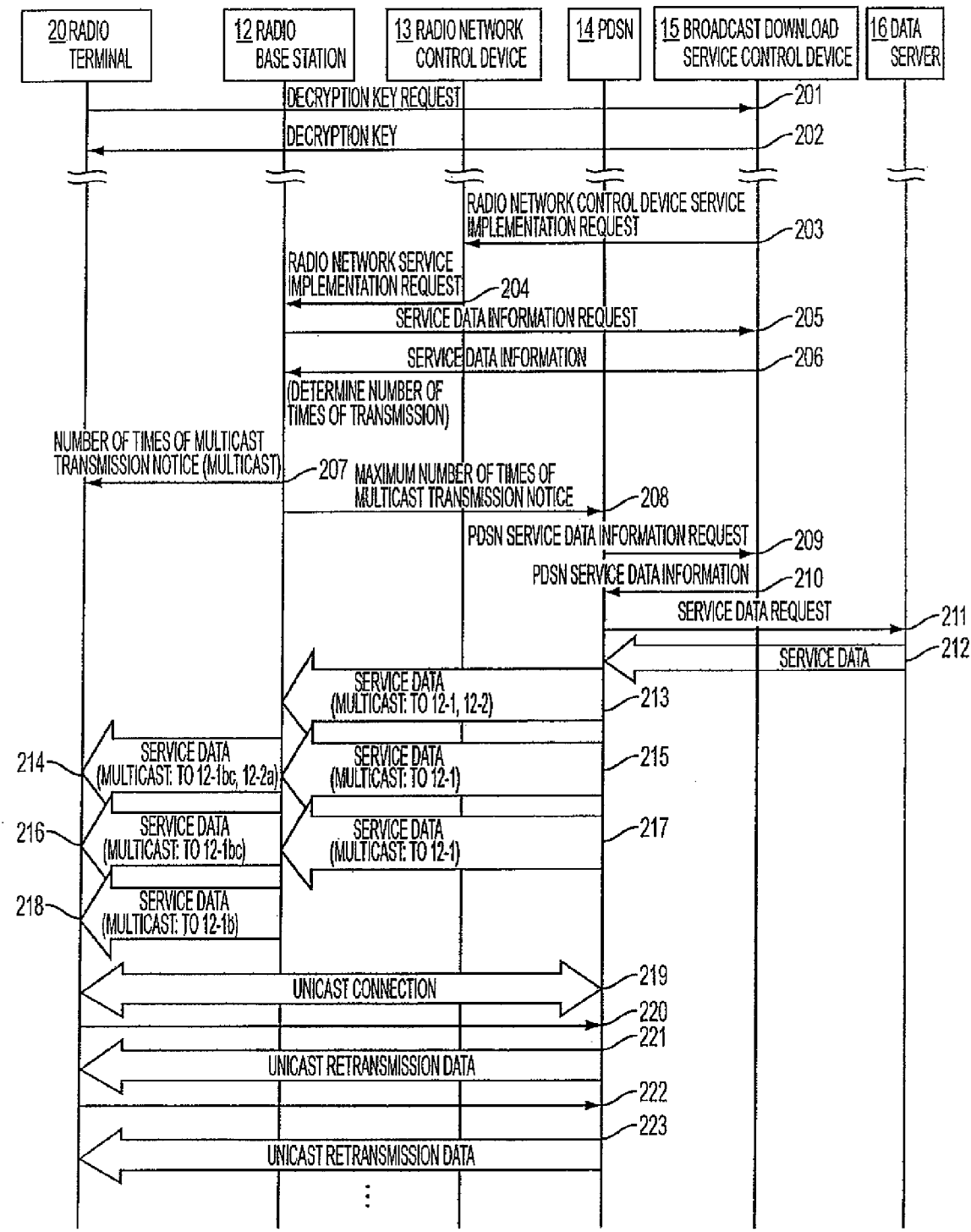
FIG. 2 is a diagram showing a communication procedure of the invention on a basis of the example of the radio information transmitting system in FIG. 1.
Figure 13B:
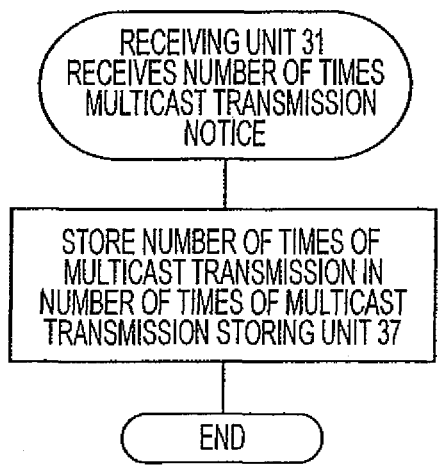

FIG. 13B is a flowchart of control at the time when information received by the receiving unit 31 is a number of times of multicast transmission notice from the radio base station 12 (207 in FIG. 2). When the information received by the receiving unit 31 is the number of times of multicast transmission notice from the radio base station 12, the control unit 34 stores the number of times of multicast transmission in the number of times of multicast transmission storing unit 37.

Figure 14:
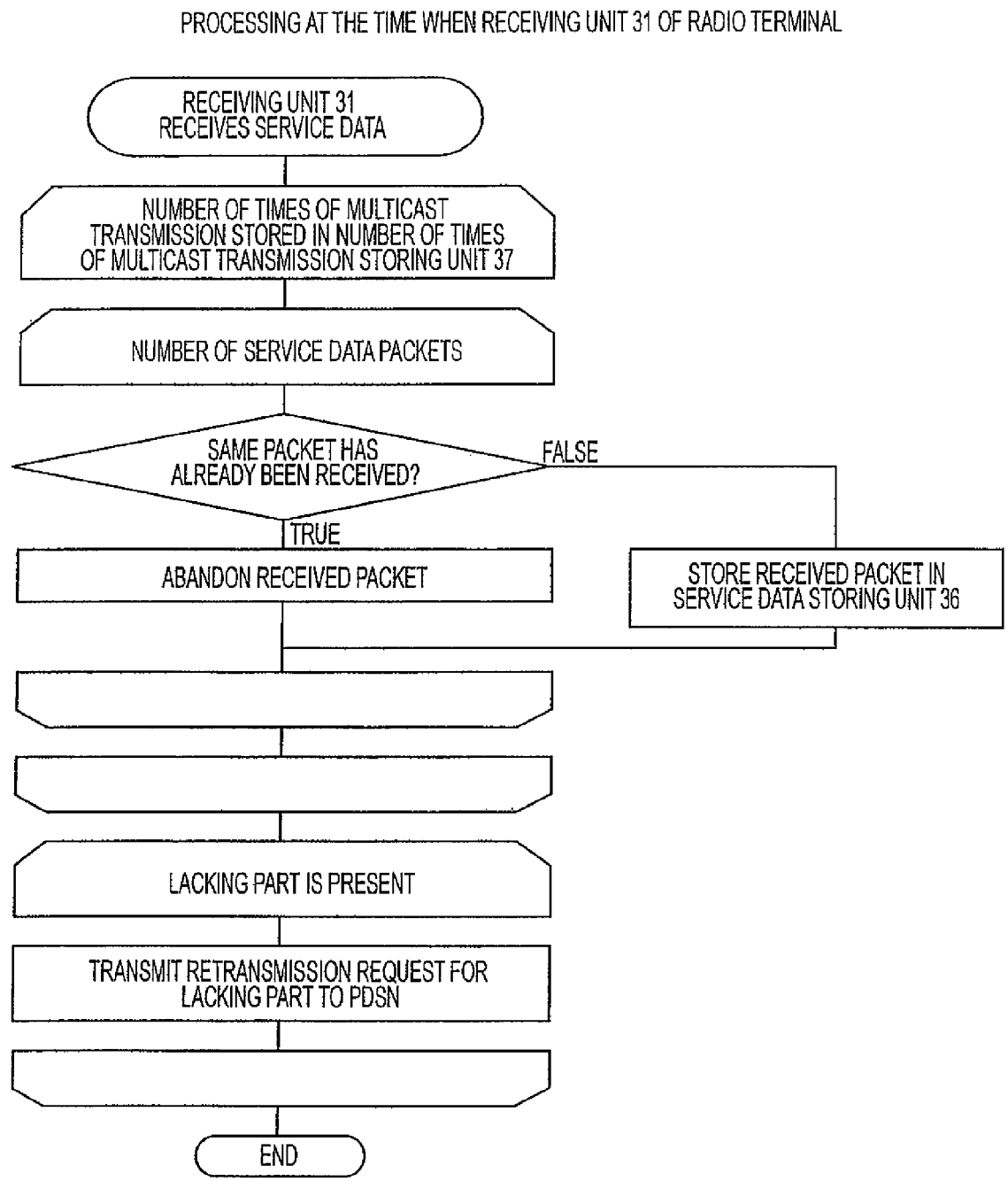
FIG. 14 is a flowchart of detailed processing of the radio terminal.

FIG. 14 is a flowchart of control at the time when information received by the receiving unit 31 is service data from the radio base station 12 (214, 216, and 218 in FIG. 2). When the information received by the receiving unit 31 is the service data from the radio base station 12, the control unit 34 stores the service data in the service data storing unit 36. In that case, when the packet received has already been received, it is possible to abandon the received packet. When the service data is received the number of times stored in the number of multicast transmission storing unit 37, the control unit 34 transmits a retransmission request for a lacking data.

Figure 4:
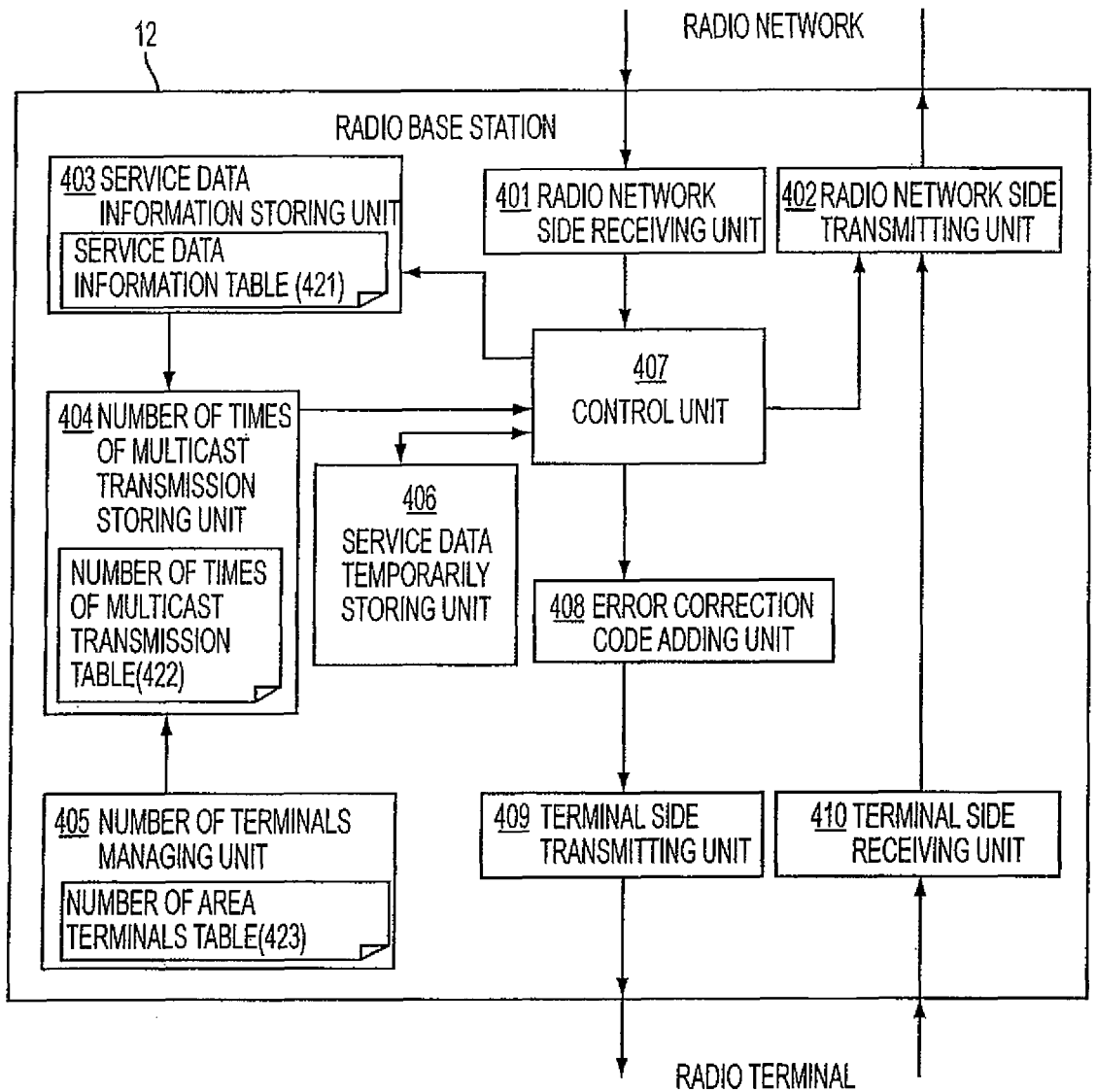
FIG. 4 is a block diagram showing a functional constitution of a radio base station.

FIG. 4 is a block diagram showing a functional constitution of the radio base station 12. The radio base station 12 includes, for example, a radio network side receiving unit 401, a radio network side transmitting unit 402, a service data information storing unit 403, a number of times of multicast transmission storing unit 404, a number of terminals managing unit 405, a service data temporarily storing unit 406, a control unit 407, an error correction code adding unit 408, a terminal side transmitting unit 409, and a terminal side receiving unit 410. The service data information storing unit 403, the number of times of multicast transmission storing unit 404, and the number of terminals managing unit 405 may be constituted by one memory or may be constituted by plural memories.

The radio network side receiving unit 401 receives information from a radio network side. The radio network side transmitting unit 402 transmits information to the radio network side. The terminal side transmitting unit 409 transmits information to the radio terminal 20 by radio. The terminal side receiving unit 410 receives information transmitted from the radio terminal 20 by radio. The error correction code adding unit 408 adds an error correction code to information transmitted from the terminal side transmitting unit 409.

The service data information storing unit 403 manages service data information according to a service data information table 421. The number of times of multicast transmission storing unit 404 manages the number of times of multicast transmission for each of the areas according to a number of times of multicast transmission table 422. The number of terminals managing unit 405 manages the number of multicast reception terminals for each of the areas according to a number of area terminals table 423. Detailed constitutions of the respective tables are described later. The service data temporarily storing unit 406 temporarily stores service data received by the radio network side receiving unit 401 before a transmission time, for example, until the transmission time comes and the service data is transmitted from the terminal side transmitting unit 409.

When the radio network side receiving unit 401 receives information, the control unit 407 performs control according to a type of the information received. When a service start time comes, the control unit 407 performs control corresponding to the service start time. The control by the control unit 407 will be explained.

FIGS. 15A and 15B and FIGS. 16A and 16B are flowcharts showing detailed processing of the radio base station 12.

Figure 15A:
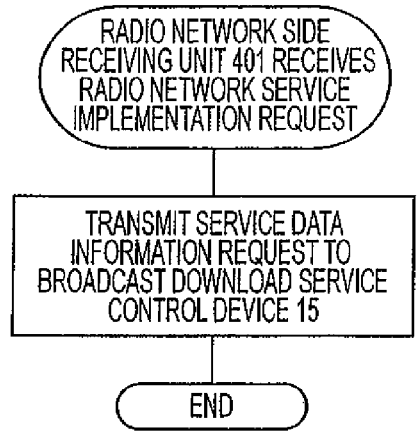
FIGS. 15A and 15B are flowcharts of detailed processing of the radio base station.

FIG. 15A is a flowchart of control at the time when information received by the radio network side receiving unit 401 is a radio network service implementation request from the radio network control device 13 (204 in FIG. 2). When the information received by the radio network side receiving unit 401 is the radio network service implementation request from the radio network control device 13, the control unit 407 transmits a service data information request to the broadcast download service control device 15.

Figure 15B:
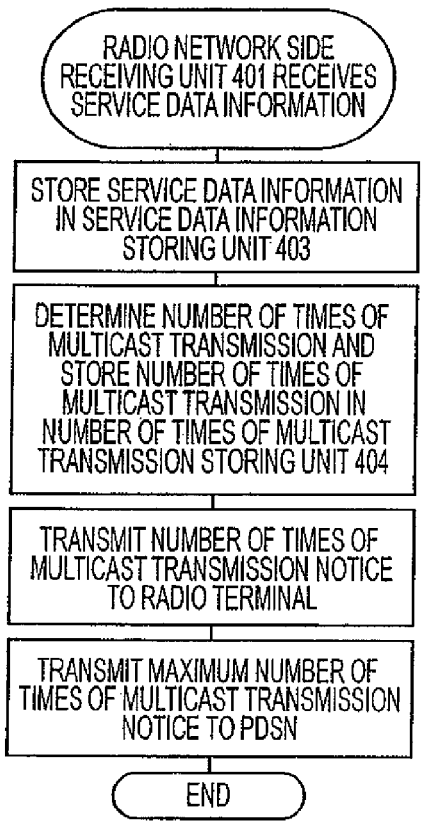

FIG. 15B is a flowchart of control at the time when information received by the radio network side receiving unit 401 is service data information from the broadcast download service control device 15 (206 in FIG. 2). When the information received by the radio network side receiving unit 401 is the service data information from the broadcast download control device 15, the control unit 407 stores the service data information in the service data information storing unit 403. The service data information table 421 shown in FIG. 9 is created in the service data information storing unit 403.

The control unit 407 determines the number of times of multicast transmission for each of the areas on a basis of the number of terminals for each of the areas stored in the number of terminals managing unit 405 and the number of service data packets stored in the service data information storing unit 403 and/or a packet error rate and stores the number of times of multicast transmission in the number of times of multicast transmission storing unit 404 in association with an identifier of the area. The number of times of multicast transmission table 422 shown in FIG. 10A is created in the number of times of multicast transmission storing unit 404. The control unit 407 transmits data indicating the number of times of multicast transmission corresponding to each of the areas to the radio terminal 20 in the area. The control unit 407 notifies the PDSN 14 of the largest number of times of transmission among the numbers of times of multicast transmission for respective areas.

Figure 16A:
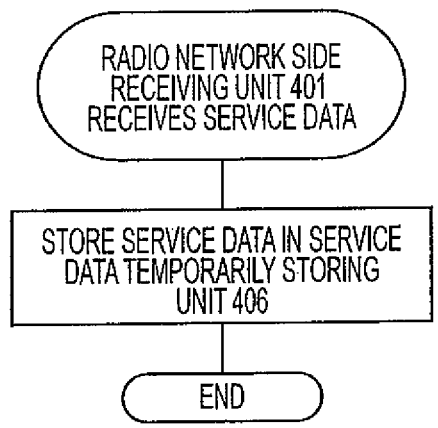
FIGS. 16A and 16B are flowcharts of detailed processing of the radio base station.

FIG. 16A is a flowchart of control at the time when information received by the radio network side receiving unit 401 is service data from the PDSN 14 (213, 215, and 217 in FIG. 2). When the information received by the radio network side receiving unit 401 is the service data from the PDSN 14, the control unit 407 temporarily stores the service data in the service data temporarily storing unit 406.

Figure 16B:
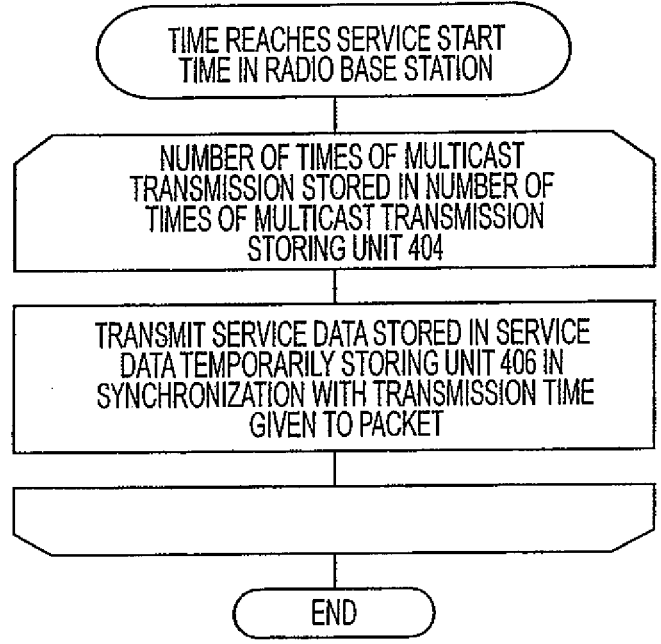

FIG. 16B is a flowchart of control at the time when the service start time stored in the service information storing unit 403 comes. When the service start time comes, the control unit 407 transmits service data to the terminal 20 in the respective areas the number of times of transmission corresponding to the areas stored in the number of times of multicast transmission storing unit 404. In this case, it is possible to transmit the service data in synchronization with a transmission time given to a packet. This is for the purpose of achieving synchronization among the radio base stations 12 to make it possible to continue to perform reception even if the radio terminal 20 moves among the radio base stations 12 during a service.

Figure 5:
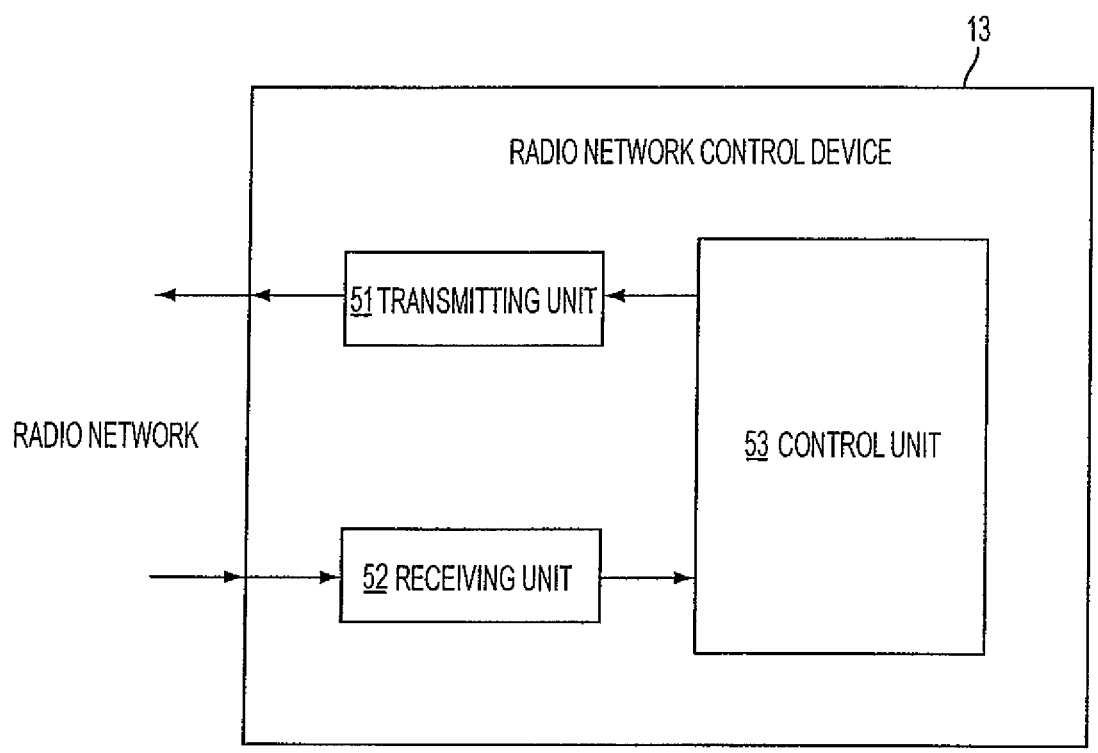
FIG. 5 is a block diagram showing a functional constitution of a radio network control device.

FIG. 5 is a block diagram showing a functional constitution of the radio network control device 13. The radio network control device 13 includes, for example, a transmitting unit 51, a receiving unit 52, and a control unit 53. The transmitting unit 51 transmits radio network control information from the control unit 53 to the radio network. The receiving unit 52 receives service implementation information from the broadcast download service control device 15.

Figure 17:
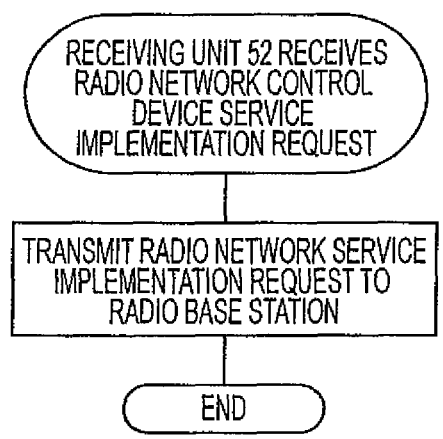
FIG. 17 is a flowchart of processing at the time when the radio network control device receives a radio network control device service implementation request.

FIG. 17 is a flowchart of processing at the time when the radio network control device 13 receives a radio network control device service implementation request. When the receiving unit 52 receives a radio network control device service implementation request from the broadcast download service control device 15 (203 in FIG. 2), as shown in the flowchart in FIG. 17, the control unit 53 transmits a radio network service implementation request to the radio base station 12.

Figure 6:
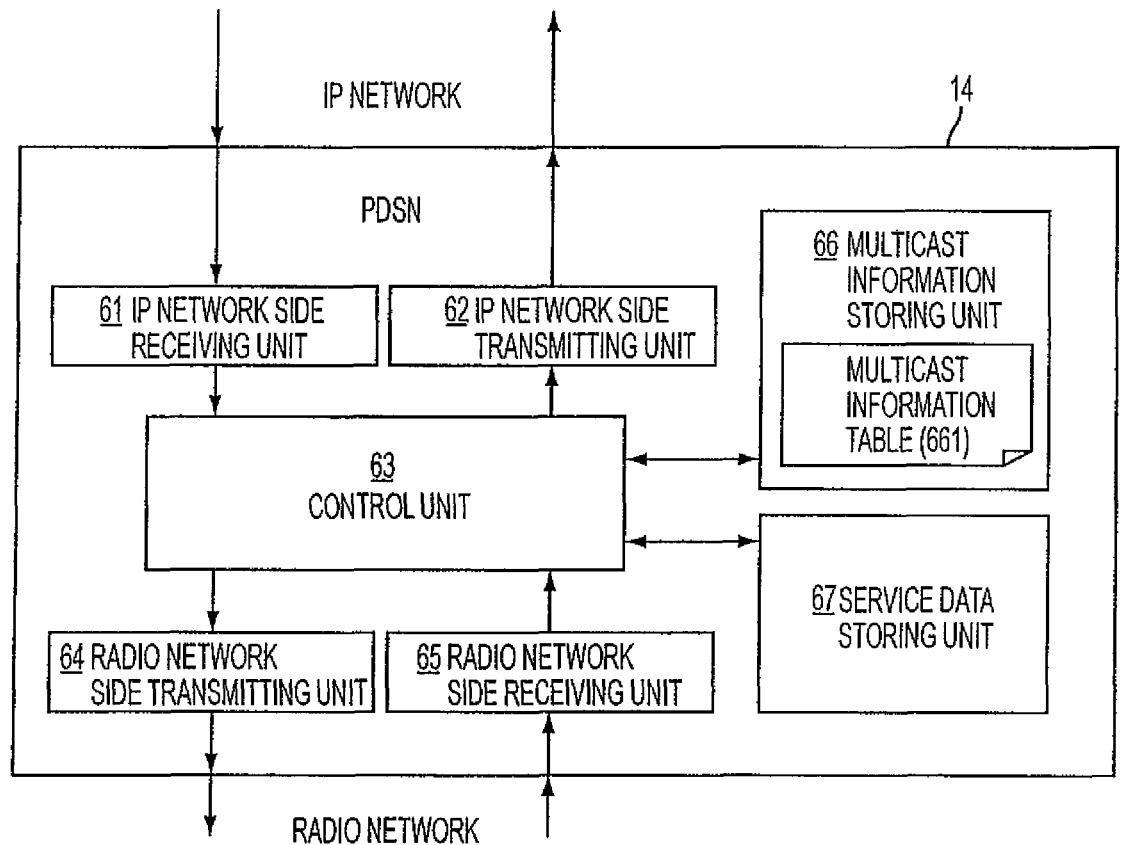
FIG. 6 is a block diagram showing a functional constitution of a PDSN.

FIG. 6 is a block diagram showing a functional constitution of the PDSN 14. The PDSN 14 includes, for example, an IP network side receiving unit 61, an IP network side transmitting unit 62, a control unit 63, a radio network side transmitting unit 64, a radio network side receiving unit 65, a multicast information storing unit 66, and a service data storing unit 67. The multicast information storing unit 66 and the service data storing unit 67 may be constituted by one memory or may be constituted by plural memories.

The IP network side receiving unit 61 receives information from the IP network. The IP network side transmitting unit 62 transmits information to the IP network. The radio network side transmitting unit 64 transmits information to the radio network. The radio network side receiving unit 65 receives information from the radio network. The multicast information storing unit 66 has a multicast information table 661. As an example, the number of times of multicast transmission passed from the control unit 63 is stored in the multicast information table 661. Details of the table are described later. The service data storing unit 67 stores service data passed from the control unit 63.

The control unit 63 performs control according to a type of information received by the IP network side receiving unit 61 or the radio network side receiving unit 65. When time reaches a PDSN service data transmission start time in the multicast information table 661 of the multicast information storing unit 66, the control unit 63 performs control corresponding to the PDSN service data transmission start time. The control by the control unit 63 will be explained.

FIGS. 18A and 18B and FIGS. 19A to 19C are flowcharts showing detailed processing of the PDSN.

Figure 18A:
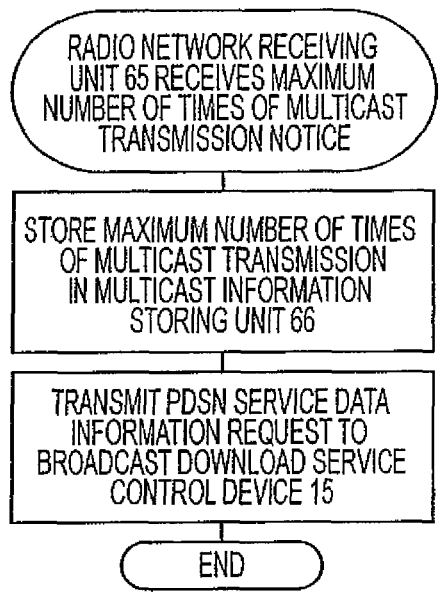
FIGS. 18A and 18B are flowcharts of detailed processing of the PDSN.

FIG. 18A is a flowchart of control at the time when information received from the radio network side receiving unit 65 is a maximum number of times of multicast transmission notice from the radio base station 12 (208 in FIG. 2). When the information received by the radio network side receiving unit 65 is the maximum number of times of multicast transmission notice from the radio base station 12, the control unit 63 stores an identifier (ID) of the radio base station 12 that transmits the notice, a service data number, and the maximum number of times of multicast transmission notified in the multicast information storing unit 66 in association with one another. The multicast information table 661 is created in the multicast information storing unit 66. The control unit 63 transmits a PDSN service data information request to the broadcast download service control device 15.

Figure 18B:
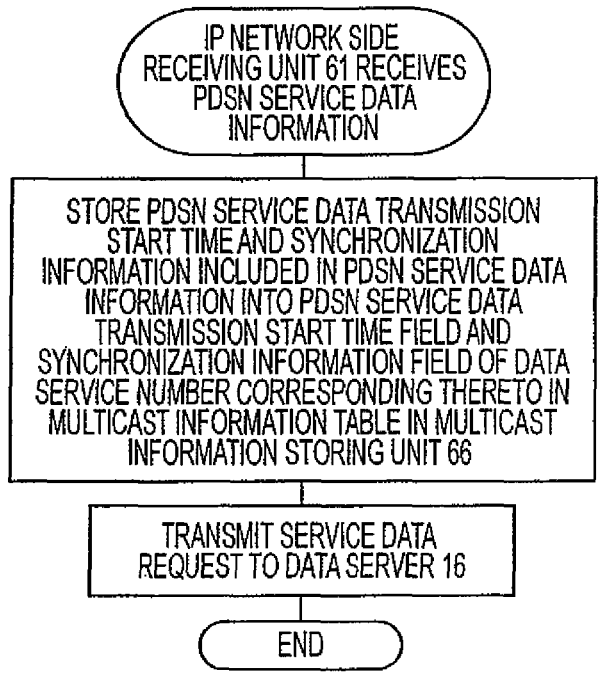

FIG. 18B is a flowchart of control at the time when information received by the IP network side receiving unit 61 is a PDSN service data information from the broadcast download control device 15. When the information received by the IP network side receiving unit 61 is the PDSN service data information from the broadcast download control device 15 (210 in FIG. 2), the control unit 63 stores a PDSN service data transmission start time and synchronization information included in the PDSN service data information in the multicast information table 661 in the multicast information storing unit 66. For example, the control unit 63 stores respective pieces of information in a PDSN service data transmission start time space and a synchronization information space corresponding to a data service number included in the PDSN service data information. In the processing in FIG. 18A, the control unit 63 may store the identifier, the service data number, and the maximum number of multicast transmission in an entry same as an entry in which IDs of the radio base stations 12 are stored. The control unit 63 transmits a service data request to the data server 16.

FIG. 19A is a flowchart of control at the time when the IP network side receiving unit 61 receives service data (212 in FIG. 2). When the IP network side receiving unit 61 receives the service data, the control unit 63 stores the service data in the service data storing unit 67.

FIG. 19B is a flowchart of control at the time when time reaches the PDSN service data transmission start time stored in the multicast information table 661 in the multicast information storing unit 66. When the time reaches the PDSN service data transmission start time stored in the multicast information table 661 in the multicast information storing unit 66 first, the control unit 63 divides the service data stored in the service data storing unit 67 into packets. The control unit 63 gives sequence numbers and transmission times in the radio base stations 12 calculated on a basis of the synchronization information to the respective packets. The control unit 63 transmits the packets to the respective base stations in multicast the number of times of multicast transmission corresponding to the base stations in accordance with the respective radio base station IDs stored in the multicast information storing unit 66.

FIG. 19C is a flowchart of control at the time when the radio network side receiving unit 65 receives a retransmission request from the radio terminal 20 (220 and 222 in FIG. 2). When the radio network side receiving unit 65 receives the retransmission request from the radio terminal 20, the control unit 63 transmits, in unicast, a requested part in the service data stored in the service data storing unit 67 to the radio terminal 20.

Figure 7:
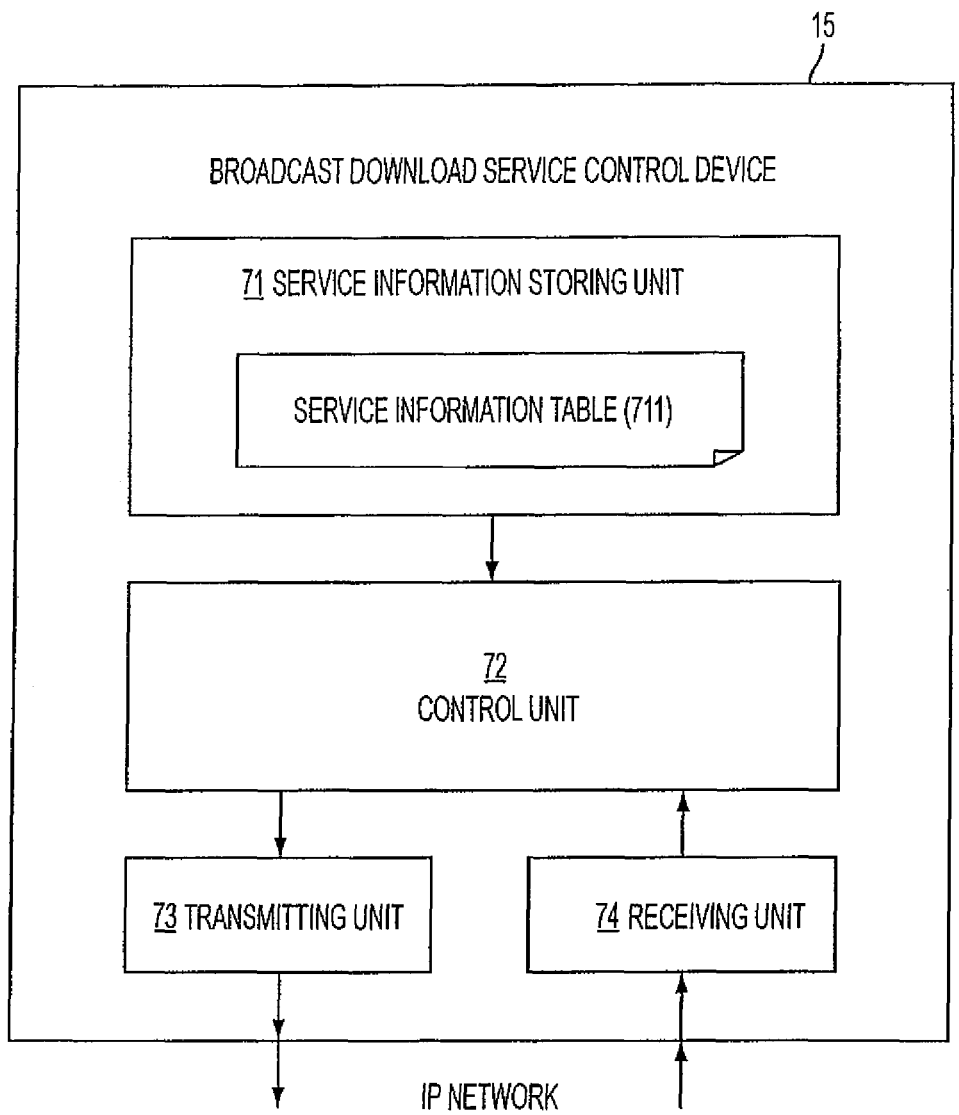
FIG. 7 is a block diagram showing a functional constitution of a broadcast download service control device.

FIG. 7 is a block diagram showing a functional constitution of a broadcast download service control device. The broadcast download service control device includes, for example, a service information storing unit 71, a control unit 72, a transmitting unit 73, and a receiving unit 74.

The service information storing unit 71 has a service information table 711. The transmitting unit 73 transmits information passed from the control unit 72. The receiving unit 74 receives, for example, a decryption key request from the radio terminal 20 and a service data information request from the radio base station 12. The control unit 72 performs control according to a type of information received by the receiving unit 74. When time reaches a radio network control device service start request transmission time stored in the service information storing unit 71, the control unit 72 performs control corresponding to the radio network control device service start request transmission time. The control by the control unit 72 will be explained.

FIGS. 20A and 20B and FIGS. 21A and 21B are flowcharts of detailed processing of the broadcast download service control device.

Figure 20A:
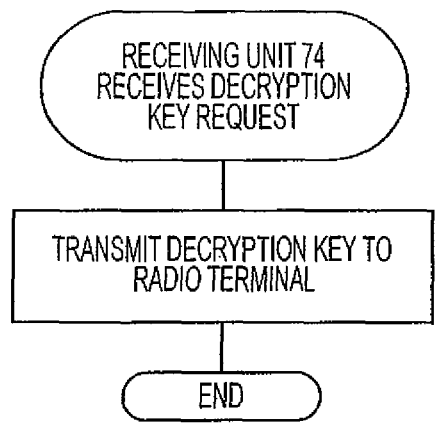
FIGS. 20A and 20B are flowcharts of detailed processing of the broadcast download service control device.

FIG. 20A is a flowchart of control at the time when received information is a decryption key request from the radio terminal 20 (201 in FIG. 2). When the received information is the decryption key request from the radio terminal 20, the control unit 72 refers to the service information table 711 stored in the service information storing unit 71 and transmits a decryption key corresponding to a service data number included in the request to the radio terminal 20.

Figure 20B:
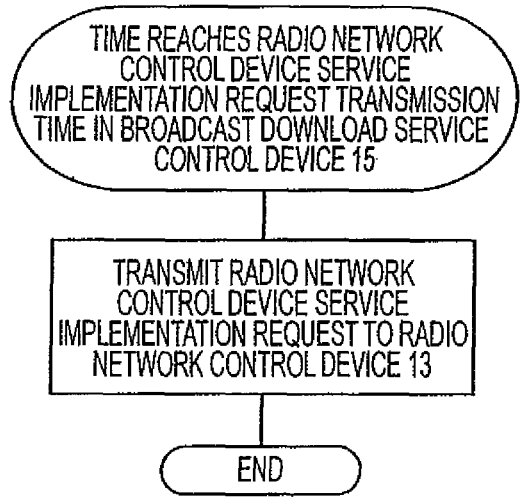

FIG. 20B is a flowchart of control at the time when time reaches a radio network control device service implementation request transmission time stored in the service information storing unit 71. When the time reaches the radio network control device service implementation request transmission time stored in the service information storing unit 71, the control unit 72 includes, in a radio network control device service implementation request, a service data number and a service area corresponding to the service in the service information table 711 in the service information storing unit 71 and transmits the radio network control device service implementation request to the radio network control device 13.

Figure 21A:
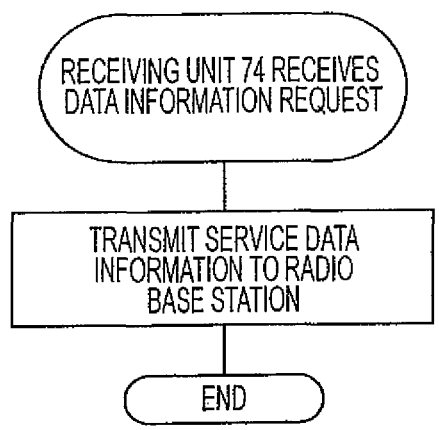
FIGS. 21A and 21B are flowcharts of detailed processing of the broadcast download service control device.

FIG. 21A is a flowchart of control at the time when received information is a service data information request from the radio base station 12 (205 in FIG. 2). When the received information is the service data information request from the radio base station 12, the control unit 72 transmits service data information, which includes the number of service data packets, a service start time, and a number of times of multicast transmission determining method ID corresponding to a requested service data number, and a coefficient value $C_1$, $C_2$, or $C_3$ corresponding to the service data number, in the service information table 711 stored in the service information storing unit 71 to the radio station 12.

Figure 21B:
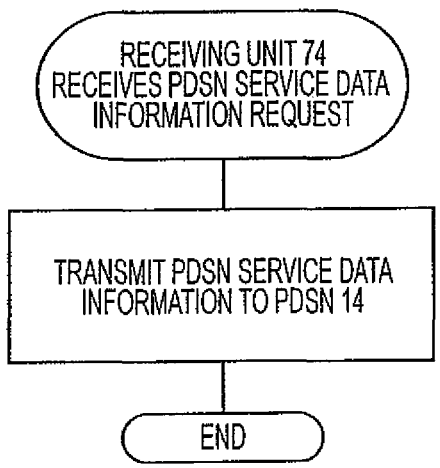

FIG. 21B is a flowchart of control at the time when information received by the receiving unit 64 is a PDSN service data information request from the PDSN 14. When the information received by the receiving unit 64 is the PDSN service data information request from the PDSN N14, the control unit 72 transmits PDSN service data information, which includes a PDSN service data transmission start time and synchronization information corresponding to a requested service data number, in the service information table 711 stored in the service information storing unit 71 to the PDSN 14.

Figure 8:
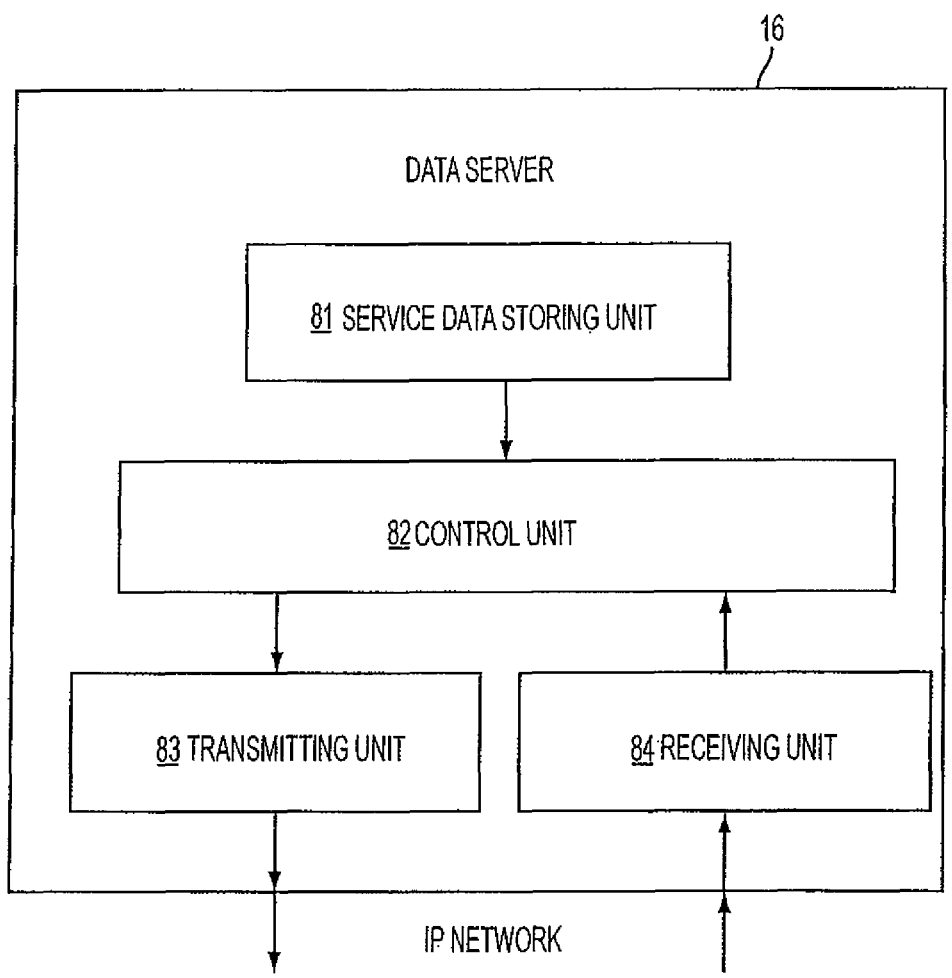
FIG. 8 is a block diagram showing a functional constitution of a data server.

FIG. 8 is a block diagram showing a functional constitution of the data server 16. The data server 16 includes, for example, a service data storing unit 81, a control unit 82, a transmitting unit 83, and a receiving unit 84.

Figure 22:
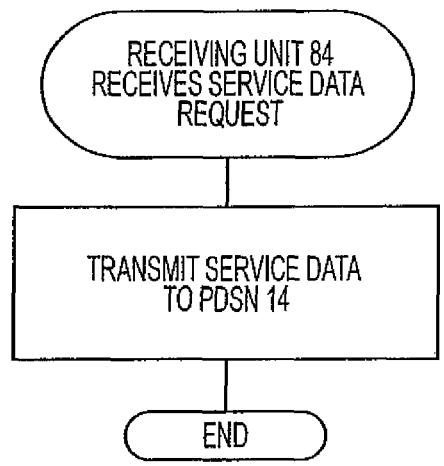
FIG. 22 is a flowchart of processing at the time when the data server receives a service data request.

The service data storing unit 81 stores service data. The transmitting unit 83 transmits service data passed from the control unit 82 to the PDSN 14 through the IP network. The receiving unit 84 receives, for example, a service data request from the PDSN 14. As shown in a flowchart in FIG. 22, when the receiving unit 84 receives a service data request (211 in FIG. 2), the control unit 82 transmits service data corresponding to the service data request in the service data storing unit 81 to the PDSN 14.

(Table Format)

FIG. 9 is a format diagram of the service data information table 421 in the radio base station 12.

The service data information table 421 includes, for example, a service data number, a service area, the number of service data packets, a service start time, a number of times of multicast transmission determining method ID, and coefficient values $C_1$ to $C_3$.

The service data number is a number for identifying service data. An appropriate identifier such as a character or a sign may be used other than the number. The service area indicates an area to which the service data is transmitted. The number of service data packets indicates the number of packets of the service data indicated by the service data number. The service start time indicates time when transmission of the service data is started. The number of times of multicast transmission determining method ID is an identifier for selecting a method for calculating the number of times of multicast transmission when there are plural methods of determining the number of times of multicast transmission. For example, it is possible to store anyone of 1 to 3 as the ID. However, the ID is not limited to this. The coefficient values $C_1$ to $C_3$ are coefficient values that are used in determining the number of times of multicast transmission. It is possible to store appropriate coefficient values as the coefficient values according to the number of times of multicast transmission determining method ID. In an example in FIG. 9, the number of times of multicast transmission determining method ID is 1 and the coefficient value $C_1$ used for calculation by the method is stored. Fields for $C_1$ to $C_3$ do not always have to be provided. Values of $C_1$ to $C_3$ may be appropriately stored in one or plural fields in which coefficient values are stored.

FIG. 10A is a format diagram of the number of times of multicast transmission table 422 in the radio base station 12.

In the number of times of multicast transmission table 422, an area and the number of times of multicast transmission are stored in association with each other for each service data. An example in FIG. 10A is an example of the number of times of multicast transmission table 422 concerning service data 1 in the radio base stations 12-1 and 12-2. In this embodiment, the number of times of multicast transmission is determined for each of the areas and stored in this table.

FIG. 10B is a format diagram of the number of area terminals table 423 in the radio base station 12. In the number of area terminals table 423, an area and the number of terminals are stored in association with each other. The number of terminals indicates, for example, the number of radio terminals that are capable of communicating in the respective areas or managed in the respective areas.

FIG. 11 is a format diagram of the multicast information table 661 of the PDSN 14.

The multicast information table 661 includes a radio base station ID, a service data number, a PDSN service data transmission start time, synchronization information, and a maximum number of times of multicast transmission.

The radio base station ID is an identifier for identifying the radio base station 12. The service data number is a number for identifying service data. The PDSN service data transmission start time indicates time when transmission of service data from the PDSN 14 to the radio base station 12 is started. The synchronization information is information for synchronizing multicasted data. The maximum number of times of multicast transmission indicates the number of times of multicast transmission to the radio base station 12. A maximum number of times of the numbers of times of multicast transmission for each of the areas in the radio base station 12 is stored in the maximum number of times of multicast transmission.

FIG. 12 is a format diagram of the service information table 711 in the broadcast download service control device 15.

The service information table 711 in the broadcast download service control device 15 includes, for example, a service data number, the number of service data packets, a service area, a radio network control device service implementation request transmission time, a PDSN service data transmission start time, synchronization information, a service start time, a number of times of multicast transmission determining method ID, coefficient values $C_1$, $C_2$, and $C_3$, and a decryption key. These pieces of information are stored in the service information table 711 in advance.

The service data number, the number of service data packets, the service area, the PDSN service data transmission start time, the synchronization information, the service start time, the number of times of multicast transmission determining method ID, and the coefficient values $C_1$, $C_2$, and $C_3$ are the same as those described above. Thus, explanations of these pieces of information are omitted. The radio network control device service implementation request transmission time indicates time when a radio network control device service implementation request is transmitted. The decryption key is a key specified by a service data number corresponding thereto and is used by the radio terminal 20 to decrypt encrypted service data.

(Operations)

Operations of the entire system will be explained.

FIG. 2 is a diagram showing a communication procedure of the radio information transmitting system in FIG. 1.

Service data of broadcast download is identified by a service data number and is encrypted by an encryption key different from each data. The radio terminal 20 desiring to be offered a broadcast download service transmits a decryption key request to the broadcast download service control device 15 before receiving service data in order to acquire a decryption key for decrypting encrypted service data (step 201). For example, it is possible to transmit the decryption key at appropriate timing such as power-on or input from an input unit. The decryption key request includes a service data number of a service desired to be offered. It is possible to store the service data number in the radio terminal 20 in advance. When the broadcast download service control device 15 receives the decryption key request, the broadcast download service control device 15 refers to the service information table 711 and transmits a decryption key corresponding to the service data number included in the decryption key request to the radio terminal 20 (step 202). The radio terminal 20 receives the decryption key and stores the decryption key in the decryption key storing unit 35.

When time reaches the radio network control device service implementation request transmission time in the service information table 711 stored in the service information storing unit 71, the broadcast download service control device 15 transmits a radio network control device service implementation request to the radio network control device 13 (step 203). The radio base network control device service implementation request includes a service data number and a service area corresponding to the radio network control device service implementation request transmission time in the service information table 711. In this embodiment, for example, it is notified that the service data 1 is transmitted in the areas 1b and 1c of the radio base station 12-1 and the area 2a of the radio base station 12-2.

The radio network control device 13 having received the radio network control device service implementation request transmits a radio network service implementation request to the radio stations 12-1 and 12-2 corresponding to the service areas (step 204). The radio network service implementation request includes a service data number and a service area same as those included in the radio network control device service implementation request (step 203). The radio base stations 12-1 and 12-2 receive the radio network control device service implementation request and store the service data number and the service area included in the request in the service data information table 421. When the radio base stations 12-1 and 12-2 receive the radio network service implementation request, the radio base stations 12-1 and 12-2 transmits service data information request for requesting information on service data of the service data number included in the radio network service implementation request to the broadcast download service control device 15 (step 205). The service data information request includes the service data number of service data information requested.

When the broadcast download service control device 15 receives the service data information request, the broadcast download service control device 15 refers to the service information table 711 and transmits service data information corresponding to the service data number included in the service data information request to the radio base stations 12-1 and 12-2 (step 206). The service data information transmitted includes, for example, the number of service data packets, a service start time, and an ID (an identifier, for example, a number, a character, or a sign) for designating a method of determining the number of times of multicast transmission. The service data information further includes coefficient values ($C_1$ to $C_3$) used for calculation of the number of times of multicast transmission in association with the number of times of multicast transmission determining method ID. The ID for designating a method of determining the number of times of multicast transmission may be omitted when one determining method is decided.

When the determining method is a method of determining the number of multicast such that the number of retransmission requesting slave stations is a predetermined ratio of a total number of slave stations (a first determining method), the service data information transmitted includes, for example, 1 as the number of times of multicast transmission determining method ID and a number of retransmission requesting slave stations expected value coefficient $C_1$. When the determining method is a method of determining the number of times of multicast such that a number of retransmission requested packets expected value per one slave station is a predetermined ratio of the number of service data packet (a second determining method), the service data information transmitted includes, for example, 2 as the number of times of multicast transmission determining method ID and a number of retransmission requested packets expected value coefficient $C_2$. When the determining method is a method of determining the number of times of multicast such that a probability that slave stations after receiving multicast a determined number of times have completed reception of all packets is a predetermined probability (a third determining method), the service data information transmitted includes, for example, 3 as the number of times of multicast transmission determining method ID and a target probability value $C_3$.

The radio base stations 12-1 and 12-2 receive the service data information from the broadcast download control device 15 and stores the number of service data packets, the service start time, the number of times of multicast transmission determining method ID, and the coefficient values included in the service data information in the service data information table 421. The radio base stations 12-1 and 12-2 determine the number of times of multicast transmission for each of the service areas with a method corresponding to the number of times of multicast transmission determining method ID.

The method of determining the number of times of multicast transmission will be explained.

First, the first determining method (ID=1) will be explained. In the first determining method, for example, the number of times of multicast is determined such that an expected value of the number of retransmission requesting slave stations for the first time is equal to or smaller than a predetermined ratio with respect to the total number of slave stations. When the number of times of multicast to be calculated is set as x, a packet error rate is set as P, the number of service data packets is set as N, the number of radio terminals in an area is set as M, and a number of first time retransmission requesting slave stations expected value coefficient is set as $C_1$, the following Expression is established.

$$M\{1-(1-P^x)^N\} \le C_1 M \qquad \text{Expression 1}$$

Therefore, for example, a minimum integer satisfying x of $$x \ge \log_P(1 - \sqrt[N]{1-C_1}) \qquad \text{Expression 2}$$

is set as the number of times of multicast transmission. It is possible to calculate the number of times of multicast transmission for each of the areas.

More specific processing will be explained. First, the radio base station 12 (e.g., the control unit 407) reads out a packet error rate from an appropriate managing unit, storing unit, or the like that manages the packet error rate P. The radio base station 12 refers to the service data information table 421 and reads out the number of service data packets N and the coefficient $C_1$ corresponding to the service data number.

Subsequently, the radio base station 12 calculates a minimum integer satisfying Expression 2 and sets the minimum integer as the number of times of multicast transmission. The radio base station 12 stores the number of times of multicast transmission calculated in the number of times of multicast transmission table 422 in association with the area. The radio base station 12 repeats the processing described above to calculate the number of times of multicast transmission for all the areas.

The second determining method (ID=2) will be explained. In the second determining method, for example, the number of times of multicast is determined such that the number of first time retransmission requesting packets per one slave station is equal to or smaller than a predetermined ratio of the number of service data packets. When the number of times of multicast to be calculated is set as x, a packet error rate is set as P, the number of service data packets is set as N, and a number of first time retransmitted packets expected value coefficient is set as $C_2$, the following Expression is established.

$$NP^x \leq C_2 N \qquad \text{Expression 3}$$

Therefore, for example, a minimum integer satisfying x of $$x \geq \log_P C_2 \qquad \text{Expression 4}$$

is set as the number of times of multicast transmission.

More specific processing will be explained. First, the radio base station 12 (e.g., the control unit 407) reads out the packet error rate P from an appropriate managing unit, storing unit, or the like that manages the packet error rate P. The radio base station 12 refers to the service data information table 421 and reads out the coefficient $C_2$ corresponding to the service data number. Subsequently, the radio base station 12 calculates a minimum integer satisfying Expression 4 and sets the minimum integer as the number of times of multicast transmission. The radio base station 12 stores the number of times of multicast transmission calculated in the number of times of multicast transmission table 422 in association with the area. The radio base station 12 repeats the processing described above to calculate the number of times of multicast transmission for all the areas.

The third determining method (ID=3) will be explained. In the third determining method, for example, the number of times of multicast is determined such that, for slave stations that have received multicast a determined number of times, a probability that reception of all packets of service data corresponding to the slave stations is completed is a predetermined probability. When the number of times of multicast to be calculated is set as x, a packet error rate is set as P, the number of service data packets is set as N, the number of radio terminals in the area is set as M, and a target probability value is set as $C_3$, the following Expression is established.

$$(1-p^x)^{NM} = C_3 \qquad \text{Expression 5}$$

Therefore, for example, x calculated according to the following Expression is set as the number of times of multicast transmission.

$$x = \log_P(1 - \sqrt[NM]{C_3}) \qquad \text{Expression 6}$$

As the number of radio terminals M, in the example shown in FIG. 1, j is used for the area 1b, k is used for the area 1c, and l is used for the area 2a.

More specific processing will be explained. First, the radio base station 12 (e.g., the control unit 407) reads out a packet error rate from an appropriate managing unit, storing unit, or the like that manages the packet error rate P. The radio base station 12 refers to the service data information table 421 and reads out the number of service data packet N and the coefficient $C_3$ corresponding to the service data number. The radio base station 12 refers to the number of area terminal table 423 and reads out the number of terminals M corresponding to the area.

Subsequently, the radio base station 12 calculates a minimum integer satisfying Expression 6 and sets the minimum integer as the number of times of multicast transmission. The radio base station 12 stores the number of times of multicast transmission calculated in the number of times of multicast transmission table 422 in association with the area. The radio base station 12 repeats the processing described above to calculate the number of times of multicast transmission for all the areas.

In this embodiment, it is possible to identify any one of the first to the third determining methods according to the number of times of multicast transmission determining method ID and determine the number of times of transmission according to the method identified. Besides, for example, one appropriate determining method may be used or a method may be selected from appropriate two methods of the first to the third determining methods. Further, rather than the radio base station 12, other appropriate devices may determine the number of times of multicast transmission.

Finally, in this embodiment, as an example, it is assumed that it is determined to perform multicast transmission three times in the area 1b, twice in the area 1c, and once in the area 2a. The radio base station 12 transmits, in multicast, a number of times of multicast transmission notice including the number of times of multicast transmission for each of the areas determined to the radio terminals 20 belonging to the area (step 207). The radio base stations 12-1 and 12-2 notify the PDSN 14 of a maximum number of multicast transmission notice including a largest number of multicast transmission among the numbers of times of multicast transmission determined earlier for the three areas of the radio base stations 12-1 and 12-2 (step 208). The maximum number of times of multicast transmission notice includes a service data number and the maximum number of times of multicast transmission. In this embodiment, as the maximum number of times of transmission, the radio base station 12-1 notifies 3 (times) and the radio base station 12-2 notifies 1 (time).

When the PDSN 14 receives the maximum number of times of multicast transmission notice, the PDSN 14 stores an ID of a radio base station that transmits the notice and the maximum number of times of multicast transmission included in the notice in the multicast information table 661 in the multicast information storing unit 66. For example, the PDSN 14 stores the ID and the maximum number of times of multicast transmission in association with the service data number. The PDSN 14 transmits a PDSN service data information request to the broadcast download service control device 15 (step 209). The PDSN service data information request includes the service data number included in the maximum number of times of multicast transmission notice (step 208). When the broadcast download service control device 15 receives the PDSN service data information request, the broadcast download service control device 15 transmits PDSN service data information to the PDSN 14 (step 210). The PDSN service data information includes a PDSN service data transmission start time and synchronization information corresponding to the service data number included in the PDSN service data information request (step 209). The broadcast download service control device 15 can acquire these pieces of information with reference to the service information table 711.

When the PDSN 14 receives the PDSN service data information, the PDSN 14 stores the PDSN service data transmission start time and the synchronization information included in the information in the multicast information table 661 and transmits a service data request to the data server 16 (step 211). The service data request includes, for example, the service data number included in the maximum number of times of multicast transmission (step 208). When the data server 16 receives the service data request, the data server 16 transmits service data corresponding to the service data number included in the service data request (step 211) to the PDSN 14 (step 212). The PDSN 14 stores the service data received from the data server 16 in the service data storing unit 67.

When the PDSN service data transmission start time included in the PDSN service data information comes (or the PDSN service data transmission start time stored in the multicast information table comes), the PDSN 14 transmits, in multicast, the service data to the radio base station 12 stored in the multicast information storing unit 66 the maximum number of times of multicast transmission (steps 213, 215, and 217). In other words, the PDSN 14 transmits the service data to the radio base station 12-1 in multicast three times and to the radio base station 12-2 once.

The radio base station 12 holds service data arrived before the service start time in the service information temporarily storing unit 406 and, when the service start time stored in the service data information table 421 comes, transmits the service data. The radio base station 12 transmits the service data to the designated service areas in multicast the determined numbers of times (steps 214, 216, and 218). In other words, the radio base station 12-1 acquires the numbers of times of the respective areas from the number of times of multicast transmission table 422-1 and transmits the service data to the area 1b three times and to the area 1c twice. The radio base station 12-2 transmits the service data to the area 2a once.

When the broadcast download service is started, the radio terminal 20 receives the service data the number of times of multicast transmission stored in the number of times of multicast transmission storing unit 37. The radio terminal 20 may decrypt the service data using the decryption key stored in the decryption key storing unit 35. It is possible to abandon packets received redundantly during the reception. After receiving information in multicast the designated number of times, the radio terminal 20 judges whether any packet could not be received on a basis of, for example, sequence numbers of packets and, if there is a packet that could not be received, makes connection to the PDSN 14 in unicast (step 219). The radio terminal 20 requests the PDSN 14 to retransmit the packet that could not be received (step 220). The request includes, for example, a sequence number of the packet requested to be retransmitted. The radio terminal 20 may judge a lack of data on a basis of appropriate information other than the sequence number. Other than the PDSN, the radio terminal 20 may request, for example, the radio base station 12 to retransmit the packet.

In this embodiment, for example, the radio terminals 22a-1 to 22a-1 in the area 2a perform the processing described above after the reception of multicast data in step 214. The radio terminals 21c-1 to 21c-k in the area 1c perform the processing after the reception of multicast data in step 216. The radio terminals 21b-1 to 21b-j in the area 1b perform the processing after the reception of multicast data in step 218.

The PDSN 14 retransmits the requested packet in unicast to the respective radio terminals (slave stations) 20, which request retransmission of the packet, using the service data stored in the service data storing unit 67 (step 221). After that, the respective radio terminals 20 continue to receive retransmission in unicast from the PDSN 14 until the service data is completely received (steps 222 and 223).

According to the invention, it is possible to surely transmit information to all the slave stations. When the number of times of multicast transmission is set to be the number of times same as that in JP-A-2003-273925, it is possible to complete transmission early. For example, when time required for delivery confirmation is set as $T_a$ and the number of times of multicast is set as x, it is possible to complete transmission early by $xT_a$ compared with JP-A-2003-273925. It is possible to reduce consumption of an up transmission capacity during multicast to zero. Moreover, whereas delivery confirmation information from a terminal that receives a packet is used in JP-A-2003-273925, in the present invention, since a retransmission request from a terminal that could not receive a packet is used, it is possible to control consumption of an up transmission capacity after multicast is switched to unicast.

In this embodiment, the PDSN 14 is set as a retransmission request destination and a storage is provided in the PDSN 14. However, it is also possible that the data server 16 is selected as a retransmission destination or a storage is provided in the radio base station 12 and the radio base station 12 is set as a retransmission request destination. The processing for determining the number of times of multicast transmission may be executed by the PDSN 14 other than the radio base station 12.

It is possible to use the invention in, for example, industries related to communication system and communication services for transmitting same information to plural terminals.

According to the invention, it is possible to provide an information transmitting method and an information transmitting system for performing transmission surely and quickly without wastefully consuming a transmission capacity in broadcast download. According to the invention it is possible to control an up transmission capacity and reduce the number of times of multicast transmission as much as possible. According to the invention, it is possible to reduce time required for surely transmitting information. Moreover, according to the invention, it is possible to provide a method of determining the number of times of multicast transmission.

We claim:

1. An information transmitting method for transmitting information from a master station through a plurality of base stations to a plurality of slave stations, where the plurality of base stations transmit the information to a plurality of areas, respectively, with each area including a subset of the plurality of slave stations, the method comprising, for each respective area:

determining, on a basis of an packet error rate of the respective area, a number of times of multicast transmission required to achieve delivery where: an expected value of a number of the subset of the plurality of slave stations, that would be expected to transmit a retransmission request, is equal to or smaller than a predetermined retransmission-request value, or an expected value of a number of retransmitted packets responding to the retransmission request is equal to or smaller than a predetermined retransmitted-packets value, or a probability that the subset of the plurality of slave stations all receive all packets is equal to or larger than a predetermined receipt probability;

notifying a determined number of times of multicast transmission as determined by the determining, to the subset of the plurality of slave stations in the respective area; and transmitting, via multicast, to the subset of the plurality of slave stations in the respective area, same information formed of plural packets, for the determined number of times of multicast transmission.

2. The information transmitting method according to claim 1, wherein, in the determining, the number of times of multicast transmission is determined such that the expected value of the number of slave stations that transmit retransmission requests, is equal to or smaller than the predetermined retransmission-request value which is a result of multiplying a predetermined ratio by a total number of slave stations managed in the respective area.

3. The information transmitting method according to claim 2, wherein, in the determining, a minimum integer of a value x obtained in accordance with Expression below is set as the number of times of multicast transmission:

$$x \geq \log_P(1-\sqrt[N]{1-C_1})$$ Expression 1 where x is the number of times of multicast transmission, P is a packet error rate, N is a number of packets of transmitted information, and $C_1$ is a coefficient set in advance.

4. The information transmitting method according to claim 1, wherein,
in the determining, the number of times of multicast transmission is determined such that the expected value of the number of retransmitted packets responding to a retransmission request from one slave station, is equal to or smaller than the predetermined retransmitted-packets value which is a result of multiplying a predetermined ratio by the number of packets of transmitted information.

5. The information transmitting method according to claim 4, wherein,
in the determining, a minimum integer of a value x obtained in accordance with Expression below is set as the number of times of multicast transmission:

$$x \geq \log_P C_2$$ Expression 2 where x is the number of times of multicast transmission, P is a packet error rate, and $C_2$ is a coefficient set in advance.

6. The information transmitting method according to claim 1, wherein,
in the determining, the number of times of multicast transmission is determined such that the probability that the subset of the plurality of slave stations all receive all packets of information to be received, is equal to or larger than the predetermined receipt probability set in advance.

7. The information transmitting method according to claim 6, wherein,
in the determining, the number of times of multicast transmission is determined in accordance with Expression below:

$$x = \log_P(1-\sqrt[NM]{C_3})$$ Expression 3 where x is the number of times of multicast transmission, P is a packet error rate, N is a number of packets of transmitted information, M is a number of slave stations, and $C_3$ is a target probability value set in advance.

8. A master station for transmitting information from the master station through a plurality of base stations to a plurality of slave stations, where the plurality of base stations transmit the information to a plurality of areas, respectively, with each area including a subset of the plurality of slave stations, comprising:
a transmitting unit for transmitting information to slave stations;
a receiving unit for receiving information from the slave stations; and
a control unit that controls information transmission to the slave stations,
wherein the control unit is configured to effect operations to:
determine, on a basis of an packet error rate of the respective area, a number of times of multicast transmission required to achieve delivery where: an expected value of a number of the subset of the plurality of slave stations, that would be expected to transmit a retransmission request, is equal to or smaller than a predetermined retransmission-request value, or an expected value of a number of retransmitted packets responding to the retransmission request is equal to or smaller than a predetermined retransmitted-packets value, or a probability that the subset of the plurality of slave stations all receive all packets is equal to or larger than a predetermined receipt probability;
notify a determined number of times of multicast transmission as determined by the determine operation, to the subset of the plurality of slave stations in the respective area; and
effect transmission of, via multicast, to the subset of the plurality of slave stations in the respective area, same information formed of plural packets, for the determined number of times of multicast transmission.

9. An information transmitting method for transmitting information from a master station through a plurality of base stations to a plurality of slave stations, where the plurality of base stations transmit the information to a plurality of areas, respectively, with each area including a subset of the plurality of slave stations, the method comprising, for each respective area:
determining, on a basis of an packet error rate of the respective area, an expected number of times of multicast transmission required to achieve delivery where: an expected value of a number of the subset of the plurality of slave stations, that would be expected to transmit a retransmission request, is equal to or smaller than a predetermined retransmission-request value, or an expected value of a number of retransmitted packets responding to the retransmission request is equal to or smaller than a predetermined retransmitted-packets value, or a probability that the subset of the plurality of slave stations all receive all packets is equal to or larger than a predetermined receipt probability;
notifying the expected number of times of multicast transmission as determined by the determining, to the subset of the plurality of slave stations in the respective area; and
transmitting, via multicast, to the subset of the plurality of slave stations in the respective area, same information formed of plural packets, for the expected number of times of multicast transmission.

* * * * *